(12) United States Patent
Dar et al.

(10) Patent No.: US 11,960,763 B2
(45) Date of Patent: Apr. 16, 2024

(54) LOAD BALANCING COMBINING BLOCK AND FILE STORAGE

(71) Applicant: EMC IP Holding Company LLC, Hopkinton, MA (US)

(72) Inventors: Shaul Dar, Petach Tikva (IL); Amitai Alkalay, Kadima (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 6 days.

(21) Appl. No.: 17/238,877

(22) Filed: Apr. 23, 2021

(65) Prior Publication Data

US 2022/0342598 A1 Oct. 27, 2022

(51) Int. Cl.
*G06F 12/00* (2006.01)
*G06F 3/06* (2006.01)
*G06F 13/00* (2006.01)
*G06F 16/182* (2019.01)

(52) U.S. Cl.
CPC .......... *G06F 3/0659* (2013.01); *G06F 3/0611* (2013.01); *G06F 3/0647* (2013.01); *G06F 3/067* (2013.01); *G06F 16/1827* (2019.01)

(58) Field of Classification Search
CPC .... G06F 3/0659; G06F 3/0611; G06F 3/0647; G06F 3/067; G06F 16/1827
USPC ........................................................ 711/154
See application file for complete search history.

(56) References Cited

U.S. PATENT DOCUMENTS

| | | | | |
|---|---|---|---|---|
| 5,692,128 | A * | 11/1997 | Bolles | H04L 69/00 709/224 |
| 7,546,354 | B1 * | 6/2009 | Fan | G06F 11/2025 709/219 |
| 8,423,529 | B1 * | 4/2013 | Bloomstein | G06F 16/188 707/706 |
| 8,589,441 | B1 * | 11/2013 | Sunada | H04L 67/1097 707/703 |
| 8,683,170 | B1 * | 3/2014 | Patnaik | G06F 3/0683 711/170 |
| 9,286,007 | B1 | 3/2016 | Bono | |
| 9,298,582 | B1 * | 3/2016 | Zhang | G06F 11/3082 |
| 9,304,999 | B1 | 4/2016 | Bono et al. | |
| 10,447,524 | B1 | 10/2019 | Bono et al. | |
| 10,831,718 | B1 | 11/2020 | Bono | |
| 2004/0267752 | A1 * | 12/2004 | Wong | H04L 67/1097 707/999.009 |
| 2006/0007491 | A1 * | 1/2006 | Kanda | H04L 63/102 358/1.15 |

(Continued)

OTHER PUBLICATIONS

"Techniques for Workload Balancing," U.S. Appl. No. 17/154,191, filed Jan. 21, 2021.

*Primary Examiner* — Sheng Jen Tsai
(74) *Attorney, Agent, or Firm* — BainwoodHuang

(57) ABSTRACT

A technique for performing load balancing between storage nodes includes generating a first performance metric for volumes accessed through a first storage node and generating a second performance metric for volumes accessed through a second storage node. The volumes accessed through the first storage node include a set of volumes that belong to a NAS (network-attached storage) file server hosted by the first storage node. In response to detecting a load imbalance based on the first performance metric and the second performance metric, the technique further includes moving the NAS file server from the first storage node to the second storage node and hosting the set of volumes that belong to the NAS file server from the second storage node.

20 Claims, 6 Drawing Sheets

(56) References Cited

U.S. PATENT DOCUMENTS

| | | | | |
|---|---|---|---|---|
| 2007/0038697 A1* | 2/2007 | Zimran | G06F 16/166 | 707/E17.01 |
| 2007/0055703 A1* | 3/2007 | Zimran | H04L 67/565 | |
| 2007/0088702 A1* | 4/2007 | Fridella | H04L 61/4552 | 709/219 |
| 2008/0010485 A1* | 1/2008 | Shitomi | G06F 11/2097 | 714/3 |
| 2009/0070879 A1* | 3/2009 | Saika | G06F 21/566 | 726/24 |
| 2011/0225286 A1* | 9/2011 | Francis | H04L 63/101 | 709/224 |
| 2012/0311003 A1* | 12/2012 | Kuznetsov | G06F 16/183 | 707/827 |
| 2013/0080559 A1* | 3/2013 | Rao | H04L 43/10 | 709/208 |
| 2013/0138884 A1* | 5/2013 | Kawamura | G06F 12/0866 | 711/119 |
| 2014/0201250 A1* | 7/2014 | Littlefield | G06F 11/1464 | 707/827 |
| 2015/0356078 A1* | 12/2015 | Kishimoto | G06F 16/1827 | 707/610 |
| 2022/0035574 A1* | 2/2022 | Cain | G06F 3/0653 | |

* cited by examiner

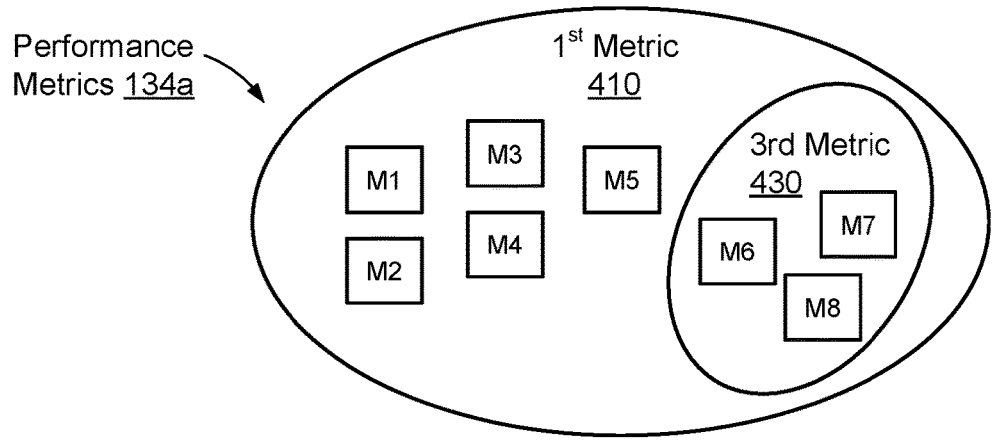
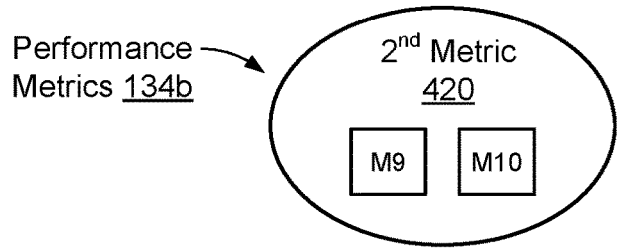
FIG. 4
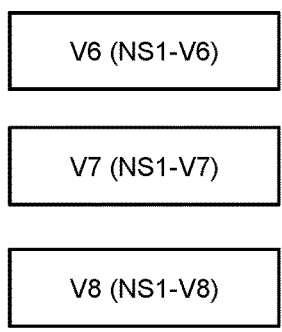
FIG. 5a
| Volume | Group |
|---|---|
| V1 | - |
| V2 | - |
| V3 | GP1 |
| V4 | GP1 |
| V5 | - |
| V6 | NS1 |
| V7 | NS1 |
| V8 | NS1 |
| V9 | - |
| V10 | - |
510
FIG. 5b

LOAD BALANCING COMBINING BLOCK AND FILE STORAGE

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

A data storage system may include multiple storage processors, also referred to herein as "storage nodes" or simply "nodes." Storage nodes can sometimes become imbalanced in their workload. For example, a first storage node may service a large number of I/O requests to read and/or write large amounts of user data, whereas a second storage node in the same data storage system may service far fewer I/O requests for accessing much smaller amounts of data.

Some storage systems attempt to rebalance workload across storage nodes when imbalances occur. For example, if a first storage node is much more heavily loaded than a second storage node, a data storage system may redirect I/O requests that are normally processed by the first storage node to the second storage node, thus achieving better balance.

SUMMARY

Some load-balancing solutions monitor I/O traffic to storage nodes on a per-volume basis. For example, a first storage node may provide host access to a first set of volumes and a second storage node in the same data storage system may provide host access to a second set of volumes. The volumes of the first and second sets of volumes may be backed by LUNs (Logical UNits) in persistent storage, and the persistent storage may be shared between the first storage node and the second storage node. If the total I/O workload attributable to the first set of volumes exceeds the total I/O workload attributable to the second set of volumes by more than some threshold amount, the data storage system may rebalance the load by moving the hosting of selected volumes from the first storage node to the second storage node. Moving the hosting of a volume may entail establishing a setting on the host (or on multiple hosts) to direct I/O requests for that volume to the second storage node rather than to the first. The second storage node then handles the I/O requests for the selected volumes. As a result, the workload of the first storage node and the workload of the second storage node become better balanced.

As used herein, the term "hosting" refers to the provision of data access to a host or other client. Thus, a storage node may "host" a volume (provide access to the volume by hosts, clients, etc.) even though the storage node may not store the data of the volume.

The above-described approach effectively performs load balancing of volumes. Unfortunately, the above approach is not as well suited for load balancing of NAS (network attached storage) file servers. NAS file servers are collections of file systems, settings, and other components which may be realized using data structures and functions that a storage node must instantiate and manage. NAS file servers are thus local to a storage node in a way that volumes are not, and the above load-balancing solution for volumes is not well-suited for NAS file servers. This is particularly the case where a storage system is provided as a block-storage server with an NAS file server running in a separate container. In such systems, the block-storage server and the NAS file server may communicate only minimally and may indeed be oblivious to one another in terms of load balancing. What is needed is a load-balancing solution that is also effective for NAS file servers.

This need is addressed at least in part by an improved technique for performing load balancing between storage nodes. The technique includes generating a first performance metric for volumes accessed through a first storage node and generating a second performance metric for volumes accessed through a second storage node. The volumes accessed through the first storage node include a set of volumes that belong to a NAS file server hosted by the first storage node. In response to detecting a load imbalance based on the first performance metric and the second performance metric, the technique further includes moving the NAS file server from the first storage node to the second storage node and hosting the set of volumes that belong to the NAS file server from the second storage node.

Advantageously, a load balancing solution is achieved for file-based data using volume-based metrics. The improved technique is also compatible with load balancing for block-based data, which may also employ volume-based metrics. For example, rebalancing workload may further include instructing hosts to direct I/O requests for a particular volume to the second storage node rather than to the first. Thus, a common load-balancing solution for both file-based data and block-based data may be realized.

Certain embodiments are directed to a method of load balancing in a data storage system. The method includes generating performance metrics that include (i) a first performance metric for a first plurality of volumes hosted by a first storage node of the data storage system and (ii) a second performance metric for a second plurality of volumes hosted by a second storage node of the data storage system. The first plurality of volumes includes a third plurality of volumes that is part of a NAS file server running on the first storage node. The method further includes detecting, based on the first performance metric and the second performance metric, a load imbalance between the first storage node and the second storage node and, in response to detecting the load imbalance, moving the NAS file server from the first storage node to the second storage node and hosting the third plurality of volumes from the second storage node.

Other embodiments are directed to a computerized apparatus constructed and arranged to perform a method of load balancing, such as the method described above. Still other embodiments are directed to a computer program product. The computer program product stores instructions which, when executed on control circuitry of a computerized apparatus, cause the computerized apparatus to perform a method of load balancing, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

FIG. 4 is a block diagram showing an example arrangement for generating aggregated I/O metrics.

FIGS. 5a and 5b are diagrams that respectively show a volume-naming convention for associating volumes that belong to a NAS file server (FIG. 4a) and a table (FIG. 4b) that associates volumes with respective NAS file servers or other groups.

DETAILED DESCRIPTION

Embodiments of the improved technique will now be described. One should appreciate that such embodiments are provided by way of example to illustrate certain features and principles but are not intended to be limiting.

An improved technique for performing load balancing between storage nodes uses volume-based performance metrics collected for the storage nodes and moves one or more NAS file servers backed by volumes from one storage node to another to achieve better workload balance. The technique is also compatible with block-based data and thus provides a common load-balancing solution for both file-based data and block-based data.

Figure 1:
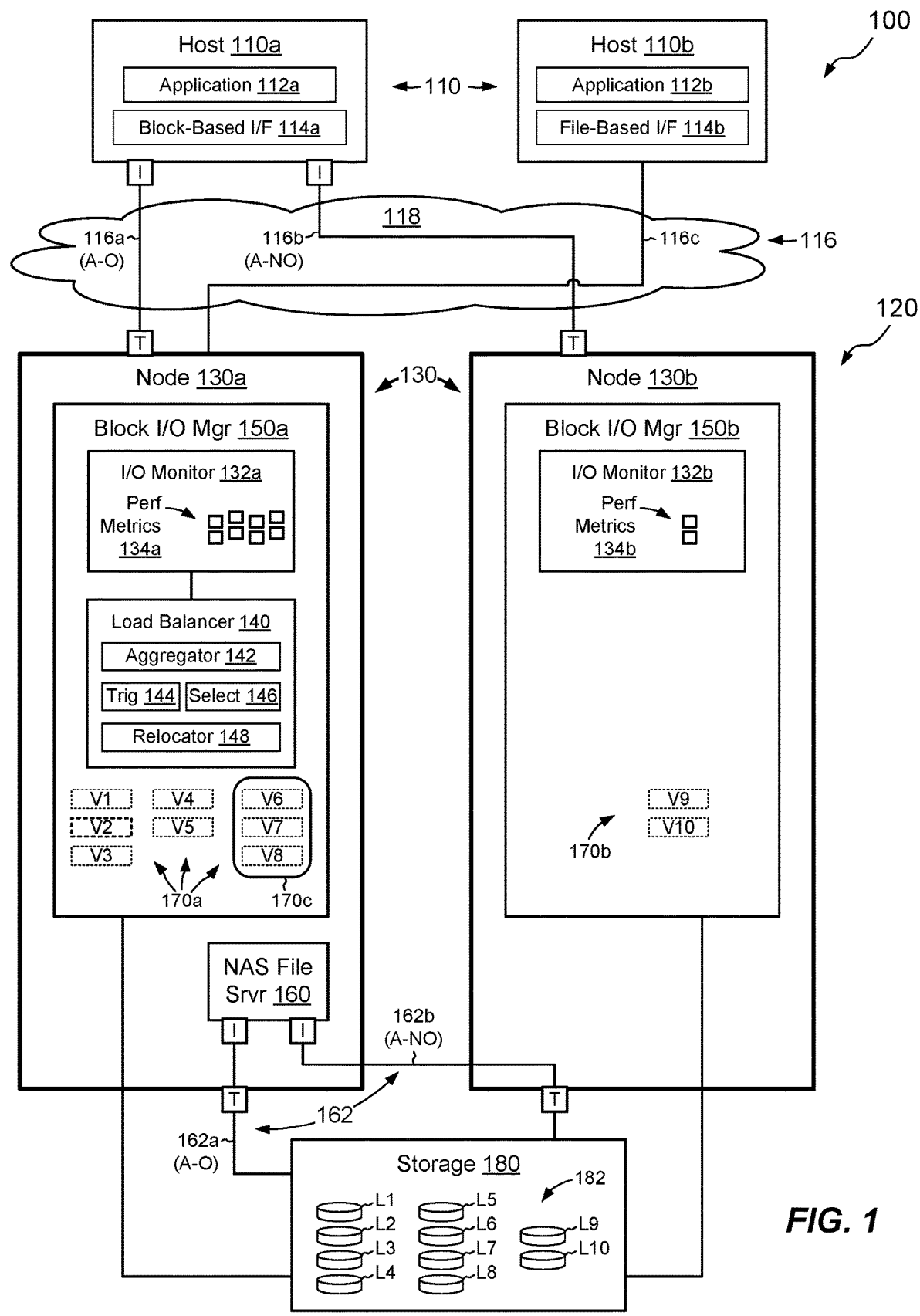
FIG. 1 is a block diagram of an example environment in which embodiments of the improved technique can be practiced.

FIG. 1 shows an example environment 100 in which embodiments of the improved technique can be practiced. Here, multiple hosts 110 are configured to access a data storage system 120 over a network 118. The data storage system 120 includes multiple storage nodes 130, such as a first storage node 130a and a second storage node 130b, as well as persistent storage 180, such as magnetic disk drives, electronic flash drives, and/or the like. Storage nodes 130 may be provided as circuit board assemblies (e.g., "blades"), which plug into a chassis that encloses and cools the storage nodes. The chassis may have a backplane or midplane for interconnecting the storage nodes, and additional connections may be made among storage nodes 130 using cables. In some examples, the data storage system 120 is provided as a storage appliance (as shown), which includes two nodes 130 that share the persistent storage 180. No particular hardware configuration is required, however, as storage nodes 130 may be provided in any arrangement and each node 130 may be any type of computing device capable of running software and processing host 110's.

The network 118 may be any type of network or combination of networks, such as one that includes a storage area network (SAN), a local area network (LAN), a wide area network (WAN), the Internet, and/or some other type of network or combination of networks, for example. Hosts 110 may connect to the storage nodes 130 using various technologies, such as Fibre Channel, iSCSI (Internet small computer system interface), NVMeOF (nonvolatile memory express (NVME) over Fabrics), NFS (network file system), and CIFS (common Internet file system), for example. As is known, Fibre Channel, iSCSI, and NVMeOF are block-based protocols, whereas NFS and CIFS are file-based protocols. Each storage node 130 is configured to receive I/O requests from hosts 110 according to block-based and/or file-based protocols and to respond to such I/O requests by reading or writing the storage 180.

In the example shown, host 110a is configured to run a host application 112a and to use a block-based interface 114a for connecting to the data storage system 120, e.g., using SCSI, iSCSI, Fibre Channel, NVMe, or the like. For instance, the host 110a includes a file system built on one or more volumes, which are hosted by the data storage system 120. The host 110a is configured to send I/O requests to the data storage system 120 for accessing such volumes using volume (or LUN) identifiers and offset ranges.

Host 110a may connect to the data storage system using multiple paths, such as paths 116a and 116b. For example, host 110a may include a multipathing facility (e.g., driver or operating system feature) for this purpose. For each of paths 116a and 116b, the host 110a may run a SCSI initiator (I) and the data storage system 120 may run a SCSI target (T). Different sets of paths 116 may be provided for respective volumes in the data storage system 120. For simplicity, only one set of paths is shown, e.g., for one volume, such as volume V2 (emphasized in the figure). Other sets of paths may be provided for other volumes.

The two paths 116a and 116b are seen to connect to respective storage nodes 130a and 130b. One path is normally designated as preferred (116a) and the other as non-preferred (116b). The storage node 130 that is connected via a preferred path for a volume handles the I/O requests directed to that volume. Administrators may set path preferences based on desired load distribution, as assigning preferred or non-preferred status effectively assigns particular volumes to respective storage nodes 130.

In an example, path preferences may be established using ALUA (asymmetric logical unit access) settings. In the example shown, path 116a is designated as ALUA active/optimized (preferred) and path 116b is designated as ALUA active/non-optimized (not preferred). With this arrangement, block-based I/O requests from host 110a pass through path 116a to storage node 130a, with path 116b (and storage node 130b) remaining on standby.

As further shown in FIG. 1, host 110b is configured to run a host application 112b and to use a file-based interface 114b for connecting to the data storage system 120 over path 116c, using a file-based protocol (e.g., NFS, CIFS, or the like), which may be deployed over Ethernet. For instance, host 110b is configured to send I/O requests that identify particular files of specified file systems in the data storage system 120.

In the example shown, the data storage system 120 organizes such file systems in NAS (network-attached storage) file servers, such as NAS file server 160. As is known, a NAS file server is a collection of file systems, settings, and other components which form a single manageable entity in a data storage system. Different NAS file servers may be used for different organizations, departments, or projects, for example, and provide a convenient way for users to manage files and directories. Further information about NAS file servers may be found in U.S. Pat. No. 10,831,718, filed Jul. 31, 2017, the contents and teachings of which are incorporated herein by reference in their entirety.

As still further shown in FIG. 1, node 130a includes a block I/O manager 150a and the above-described NAS file server 160. Block managers 150 (e.g., 150a and 150b) are configured to respond to block-based I/O requests by reading and writing data of specified volumes. The block I/O manager 150a may include an I/O monitor 132a and a load balancer 140. Also, node 130b may include a block I/O manager 150b, which includes its own I/O monitor 132b. In an example, the data storage system 120 is configured as a block-storage server, and one or more NAS file servers may be provided in separate containers, such as one or more Docker containers or virtual machines (not shown) running on the storage nodes 130. In such cases, communication between block I/O manager 150a and NAS file server 160 may be minimal.

Each I/O monitor 132 is configured to monitor I/O requests (reads and/or writes) directed to the volumes hosted by the respective storage node. For example, storage node 130a includes multiple volumes 170a, i.e., volumes V1 through V8, and I/O monitor 132a monitors reads and/or writes to volumes 170a. Likewise, storage node 130b includes multiple volumes 170b, i.e., volumes V9 and V10, and I/O monitor 132b monitors reads and/or writes to volumes 170b. When it is said that a storage node "includes" a volume, what is meant is that the storage node has been assigned the role of processing I/O for that volume. The actual data of the volumes V1 through V10 reside in LUNs 182 in persistent storage 180, e.g., in respective LUNs L1 to L10.

Monitoring reads and/or writes may include, for example, counting the numbers of read requests and noting their respective sizes (e.g., number of blocks or bytes read) and counting the numbers of write requests and noting their respective sizes. In response to this monitoring, the I/O monitors 132 generate performance metrics 134a and 134b. An example of generating performance metrics in this manner is disclosed in copending U.S. patent application Ser. No. 17/154,191, Filed Jan. 21, 2021, and entitled "TECHNIQUES FOR WORKLOAD BALANCING," the contents and teachings of which are incorporated herein by reference in their entirety. In an example, performance metrics 134a and 134b are generated on a per-volume basis, meaning that a respective metric (or set of metrics) is generated and maintained for each volume hosted by the respective storage node 130.

Although an I/O monitor 132 may be provided for each storage node 130, the load balancer 140 is typically provided on just one storage node 130, i.e., in one location for the entire data storage system 120. The load balancer 140 may alternatively be run on a separate computer, such as an administrative machine (not shown). The load balancer 140 is seen to include an aggregator 142, a trigger 144, a selector 146, and a relocator 148.

The aggregator 142 is configured to receive performance metrics 134a and 134b and selectively to aggregate performance metrics for certain groups of volumes. For example, NAS file server 160 may include file systems built upon multiple volumes 170c (i.e., V6, V7, and V8). Aggregator 142 may aggregate performance metrics for volumes 170c such that the volumes 170c may be treated as a single object for load-balancing purposes. One should appreciate that any number of NAS file servers may be provided on any of nodes 130 and that aggregator 142 may aggregate performance metrics for each of them. In addition, aggregator 142 may aggregate performance metrics for other groups of volumes, such as those belonging to the same snapshot families, or those storing similar data, which the storage system may keep together to improve the efficiency of deduplication.

Trigger 144 is configured to compare total workload of node 130a to that of node 130b (e.g., by comparing metrics 134a to metrics 134b) and to initiate a load-balancing operation when desired criteria are met. Such criteria may involve the workload of one storage node exceeding the workload of the other by more than a specified threshold. Multiple criteria may be used. Also, to avoid undesirably frequent changes, trigger 144 may employ moving averages of performance metrics 134a and 134b and/or hysteresis. It may also employ digital filters, neural networks, fuzzy logic, and/or machine learning in determining when to attempt a load-balancing operation.

Selector 146 is configured to select particular volumes or groups of volumes to be moved from one storage node to another. In determining whether to move a particular volume or group of volumes, the selector 146 may determine the per-volume performance metric(s) of that volume or group of volumes, and the overall impact that moving such volume or group would have on load balance.

Relocator 148 is configured to move selected volumes and/or groups of volumes. To move a selected volume that is not part of any NAS file server or other group from a source node to a target node, the relocator 148 may direct new ALUA settings to be established on paths to the selected volume. For example, relocator 148 may change paths 116 to the source node to ALUA active/non-optimized and may change paths to the target node to ALUA active/optimized. The effect of this change is to make the target node, rather than the source node, responsible for managing I/O for the selected volume and thus to assume the I/O workload attributable to that volume. Groups of volumes may be treated the same way, but with care taken to change ALUA settings for all volumes in each group the same way at the same time, such that ALUA settings for all volumes in a group change together.

Relocating a NAS file server also involves relocating a group of volumes (e.g., volumes V6, V7, and V8), but this alone is not sufficient. As further shown in FIG. 1, the NAS file server 160 may be configured similarly to a host 110, in that it has multiple paths 162, which in this case are directed to LUNs L6, L7, and L8 in storage 180 (only paths 162 for one LUN are shown for simplicity). As with paths 116 from the host 110a, paths 162 are also assigned preferences, with path 162a designated as ALUA active/optimized and path 162b designated as ALUA active/non-optimized. Unlike the situation with host 110a, however, where there may be no significant difference in performance between paths 116a and 116b, paths 162a and 162b do show a significant difference, as path 162b must pass through storage node 130b. This means that any data to be written or read via path 162b must pass through both nodes 130a and 130b and must also pass between them, e.g., via the network 118 or some other communication channel. Path 162b thus typically involves much higher latency than does path 162a, which is more direct. Using path 162b also consumes valuable communications bandwidth. Thus, path 162b should preferably be avoided except when path 162a fails or becomes unstable.

With this understanding, merely moving the volumes 170c from storage node 130a to storage node 130b would mean that access to those volumes from the NAS file server

160 would be through path 162b, which is not desirable. Thus, the relocator 148 preferably performs an additional step of moving the NAS file server 160 itself to node 130b. This may be part of a NAS server failover or load-balancing operation, for example, and may involve disabling the NAS file server 160 on node 130a, tearing it down, and building it back up on storage node 130b. In some examples, a separate cluster manager (not shown) orchestrates the movement of NAS file server 160 from node 130a to node 130b, with the relocator 148 merely directing the cluster manager to perform this action. Once the NAS file server 160 has been rebuilt on node 130b, hosts 110 may access the NAS file server 160 via node 130b.

An example operation of load balancing will now be described. Assume a starting scenario as shown in FIG. 1, where node 130a handles the I/O workload for volumes 170a (V1 through V8) and node 130b handles the I/O workload for volumes 170b (V9 and V10). The volumes 170a handled by node 130a include volumes 170c, the volumes upon which the file systems of NAS file server 160 are built.

Over time, the I/O monitors 132 collect respective performance metrics for volumes 170a and for volumes 170b, which may include collecting per-volume performance metrics, i.e., one or more metrics for each of the respective volumes. Metrics for reads and metrics for writes may be collected separately or may be combined, e.g., with different weights applied to reads versus writes to reflect differences in workload.

Trigger 144 checks the metrics 134a and 134b (or aggregated metrics based thereon) and applies desired criteria for initiating rebalancing. Here, we assume that the criteria are met. For example, metrics 134a and 134b may indicate a much greater load on node 130a than on node 130b. Thus, trigger 144 may attempt a rebalancing. To this end, selector 146 checks the various volumes, volume groups, and NAS file servers, to locate a set of objects which, if moved to node 130b, would establish a better workload balance overall. For this example, it is assumed that selector 146 chooses NAS file server 160 as the object to be moved. Relocator 148 then performs tasks required to move NAS file server 160 from node 130a to node 130b. For example, relocator 148 directs activities to tear down NAS file server 160 on node 130a and to build it back up on node 130b.

Figure 2:
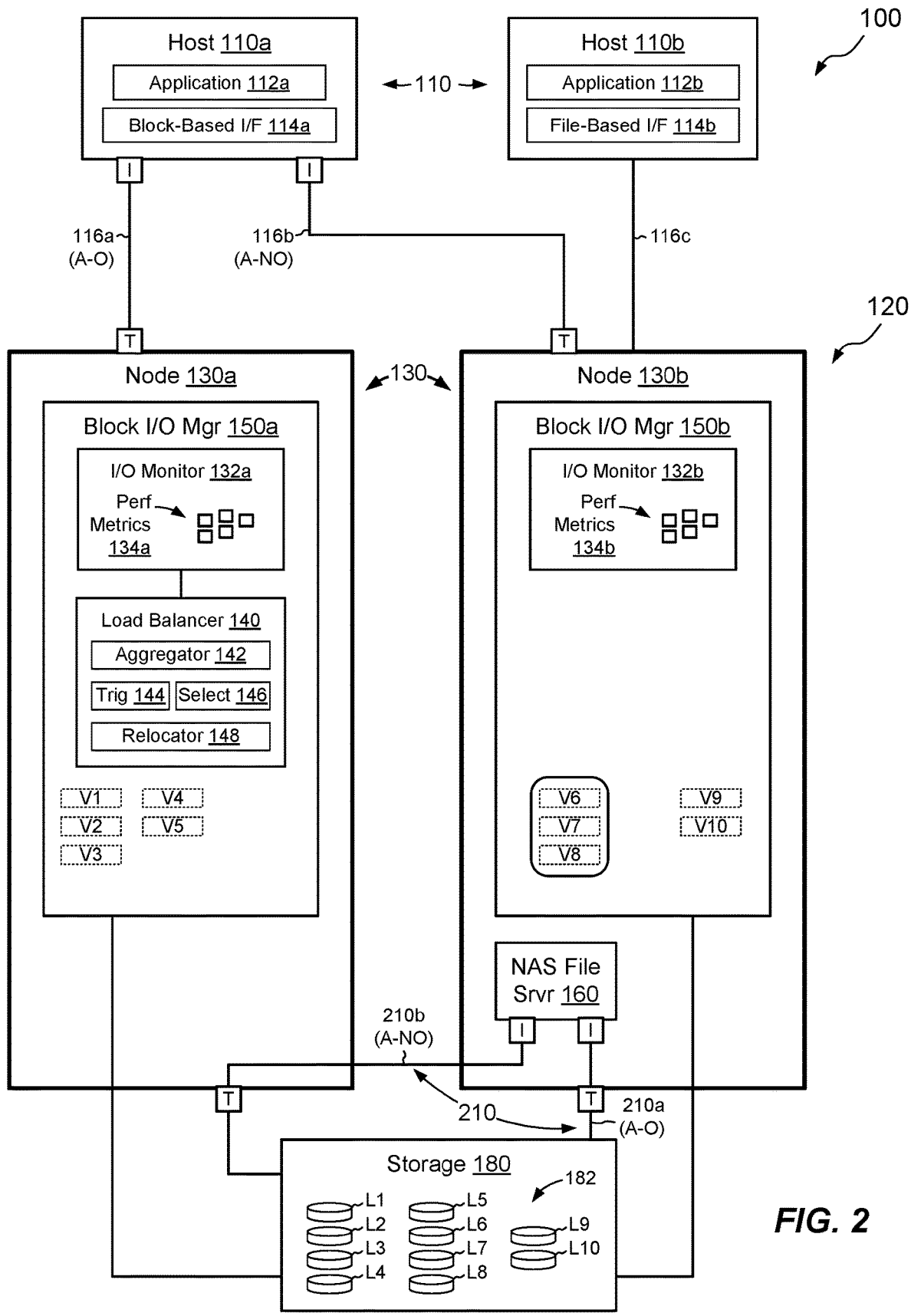
FIG. 2 is a block diagram showing the example arrangement of FIG. 1 after moving a NAS file server from a first storage node to a second storage node.

FIG. 2 shows an example result of moving NAS file server 160 from node 130a to node 130b. Here, NAS file server 160 is running on node 130b, i.e., its data structures have been instantiated on node 130b, its functions are made available, and its components are present. Also, NAS file server 160 has two paths 210 to storage 180. These include local path 210a (ALUA active/optimized) and non-local path 210b (ALUA active/non-optimized). Like path 162b in FIG. 1, path 210b is non-preferred as it extends through both storage nodes 130 and requires that data for reads and writes pass between them. Hosts can now access NAS file server 160 via node 130b.

As a result of the rebalancing, node 130a handles I/O for volumes V1 through V5 and node 130b handles I/O for volumes V6 through V10. A better overall workload balance is thereby obtained. Notably, this result is achieved by moving a file-based data object.

Figure 3:
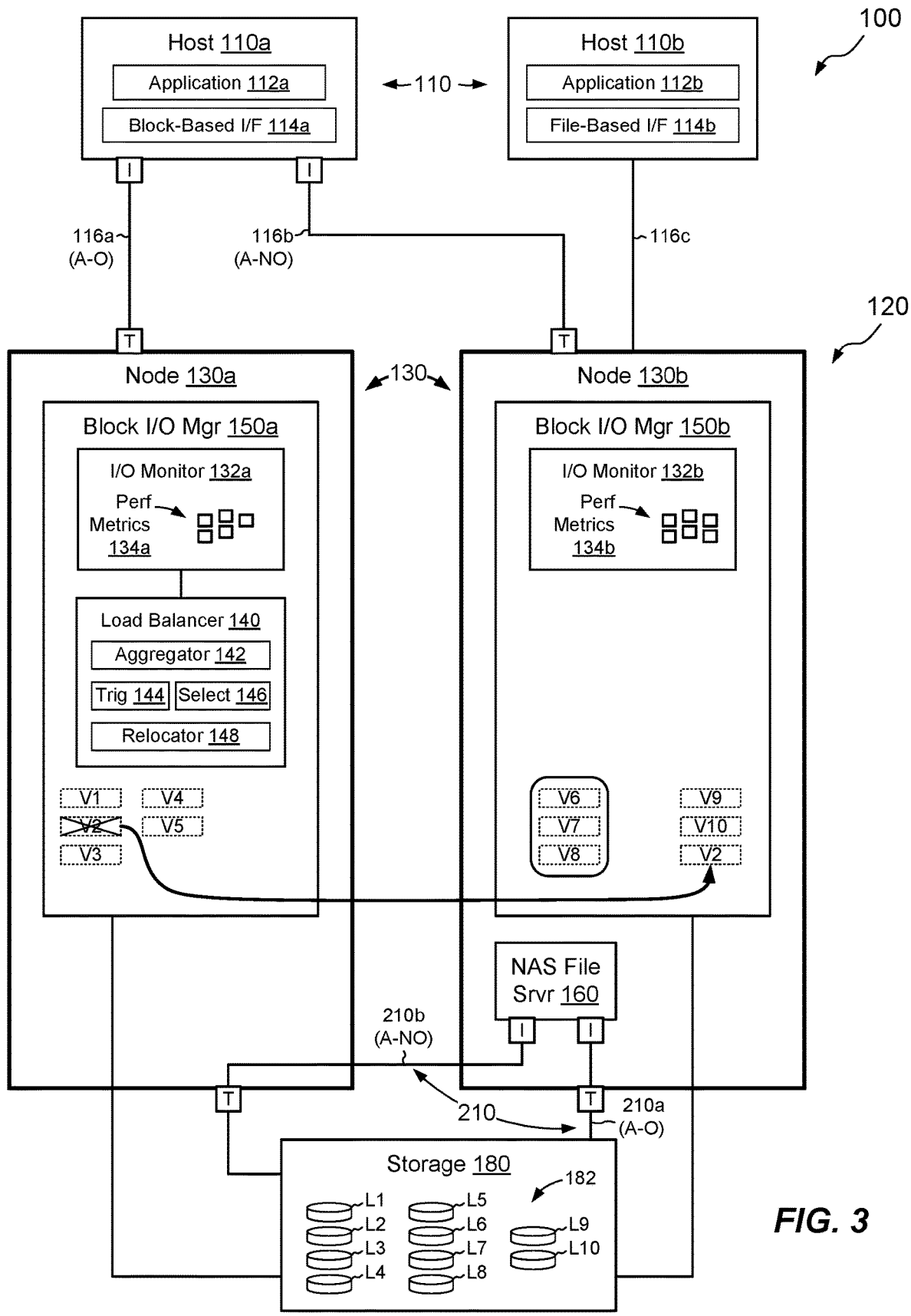
FIG. 3 is a block diagram showing the example arrangement of FIG. 2 after additionally moving a volume not associated with any NAS file server.

FIG. 3 shows an example of a further rebalancing that may be achieved by moving a block-based data object. As time passes, additional metrics 134a and 134b are collected. Trigger 144 initiates a new rebalancing attempt, and selector 146 this time chooses volume V2. Here, it is assumed that volume V2 is not part of any NAS file server or other group. Relocator 148 then moves volume V2 from node 130a to node 130b. In an example, moving volume V2 may be accomplished by changing the ALUA settings of paths 116a and 116b. For instance, relocator 148 directs a change in settings of path 116a from ALUA active/optimized to ALUA active/non-optimized. It also directs a change in settings of path 116b from ALUA active/non-optimized to ALUA active/optimized. These changes have the effect of directing I/O requests for reading and writing volume V2 to node 130b instead of to node 130a. Node 130b thus assumes the workload for volume V2, which was previously handled by node 130a. One should appreciate that changing ALUA settings on paths 116a and 116b may be carried out in a variety of ways, the details of which are not critical to this disclosure. For example, relocator 148 may contact host 110a directly, informing host 110 to change the relevant ALUA settings. Alternatively, relocator 148 may change settings of target ports (labeled "T") on the respective nodes 130, such that the ALUA settings are changed at the target port level. Various options are contemplated.

FIG. 4 shows an example arrangement for generating aggregated performance metrics, e.g., by operation of aggregator 142 of load balancer 140 (FIG. 1). In the example shown, performance metrics 134a and 134b are provided on a per-volume basis. For example, a separate metric (any of M1 through M10) is provided for each of volumes V1 through V10. The metrics M1 through M10 may each provide a single value for both reads and writes, or they may provide separate values. In some examples, the metrics M1 through M10 apply only to reads or only to writes.

As shown, a first aggregated metric 410 provides a sum (or other suitable combination) of all per-volume metrics for volumes 170a, i.e., those assigned to storage node 130a. Likewise, a second aggregated metric 420 provides a sum (or other suitable combination) of all per-volume metrics for volumes 170b, i.e., those assigned to storage node 130b. The aggregated metrics 410 and 420 may then be compared by trigger 144 (FIG. 1) in determining whether to attempt a load-balancing operation. For example, if aggregated metric 410 far exceeds aggregated metric 420, trigger 144 may attempt a rebalancing operation by directing relocator 148 to move one or more volumes from node 130a to node 130b. Likewise, if aggregated metric 420 far exceeds aggregated metric 410, trigger 144 may attempt a rebalancing by directing relocator 148 to move one or more volumes from node 130b to node 130a.

In some examples, aggregator 144 generates aggregated metrics based on NAS file servers and other groups of volumes. For example, aggregator 144 may generate a third metric 430 as a sum (or other combination) of per-volume metrics M6, M7, and M8, i.e., those describing the workload of volumes V6, V7, and V8 of the NAS file server 160.

In some examples, aggregated metric 430, as well as other aggregated metrics for NAS file servers and other groups, are not used by trigger 144 in determining whether to attempt a rebalancing. Rather, such aggregated metrics are used instead by selector 146 in selecting appropriate objects to be moved. For example, selector 146 may treat the NAS file server 160 as a single object, whose workload is represented by the third metric 430. Selector 146 may then select the NAS file server 160 as an object to be moved if moving the volumes of the NAS file server 160 together as one helps to achieve a more optimal balance.

Although the examples above assume that per-volume metrics are generated for all volumes in the data storage system 120, this is not required. For example, volumes that are parts of NAS file servers or other groups need not be tracked individually, as no action relies upon knowledge of workloads of such individual volumes. For such volumes, no per-volume metrics need to be specifically tracked or stored, provided that the workload of each such volume is represented in an aggregated metric and that the aggregated metric is available to the selector 146.

FIGS. 5a and 5b show example arrangements for identifying volumes as parts of NAS file servers or other groups, thereby identifying sets of volumes that are to be treated as single objects for purposes of relocation. As shown in FIG. 5a, a particular naming convention is applied to members of NAS file servers. For instance, a prefix (or suffix) may be added to a volume name or other identifier, which identifies the particular NAS file server to which the volume belongs. Volume V6 may thus be named NS1-V6, to indicate that volume V6 belongs to NS1 (NAS file server 1). Likewise for names of volumes V7 and V8. In FIG. 5b, a table 510 may be used for a similar purpose. The table 510 associates volumes in the data storage system 120 with associated groups. As shown, volumes V6, V7, and V8 are associated with NS1 (e.g., NAS file server 160) and thus must be kept together during rebalancing operations. Although not described previously, volumes V3 and V4 may be part of some other kind of group (GP1), such that volumes V3 and V4 must also be kept together. The group identified as GP1 may correspond to volumes that are part of the same snapshot family (and thus share some of the same data) or volumes that contain similar content, such that keeping the volumes together promotes efficient deduplication. Volumes may be grouped for any suitable reason, however.

Figure 6:
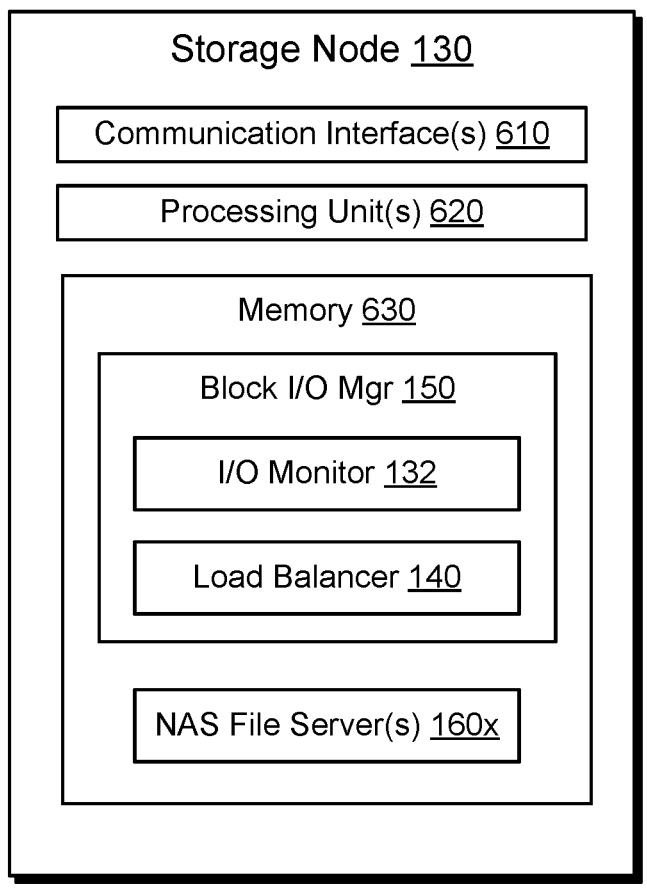
FIG. 6 is a block diagram of an example storage node.

FIG. 6 shows an example storage node 130 in greater detail. The depiction of FIG. 6 is intended to be representative of storage nodes 130a and 130b. As shown, the storage node 130 includes one or more communication interfaces 610, a set of processing units 620, and memory 630. The communication interfaces 610 include, for example, SCSI target adapters and/or network interface adapters for converting electronic and/or optical signals received over the network 118 to electronic form for use by the storage node 130. The set of processing units 620 includes one or more processing chips and/or assemblies, such as numerous multi-core CPUs (central processing units). The memory 630 includes both volatile memory, e.g., RAM (Random Access Memory), and non-volatile memory, such as one or more ROMs (Read-Only Memories), disk drives, solid state drives, and the like. The set of processing units 620 and the memory 630 together form control circuitry, which is constructed and arranged to carry out various methods and functions as described herein. Also, the memory 630 includes a variety of software constructs realized in the form of executable instructions. When the executable instructions are run by the set of processing units 620, the set of processing units 620 carries out the operations of the software constructs. Although certain software constructs are specifically shown and described, it is understood that the memory 630 typically includes many other software components, which are not shown, such as an operating system, various applications, processes, and daemons.

As shown in FIG. 6, the memory 130 realizes, e.g., by execution of software instructions, the above-described block I/O manager 150 and any number of NAS file servers 160x. The I/O manager 150 includes the I/O monitor 132 and the load balancer 140. One should appreciate that storage nodes 130a and 130b need not be identical. For example, only one storage node may include the load balancer 140. Further, a particular storage node need not include any NAS file servers 160x.

Figure 7:
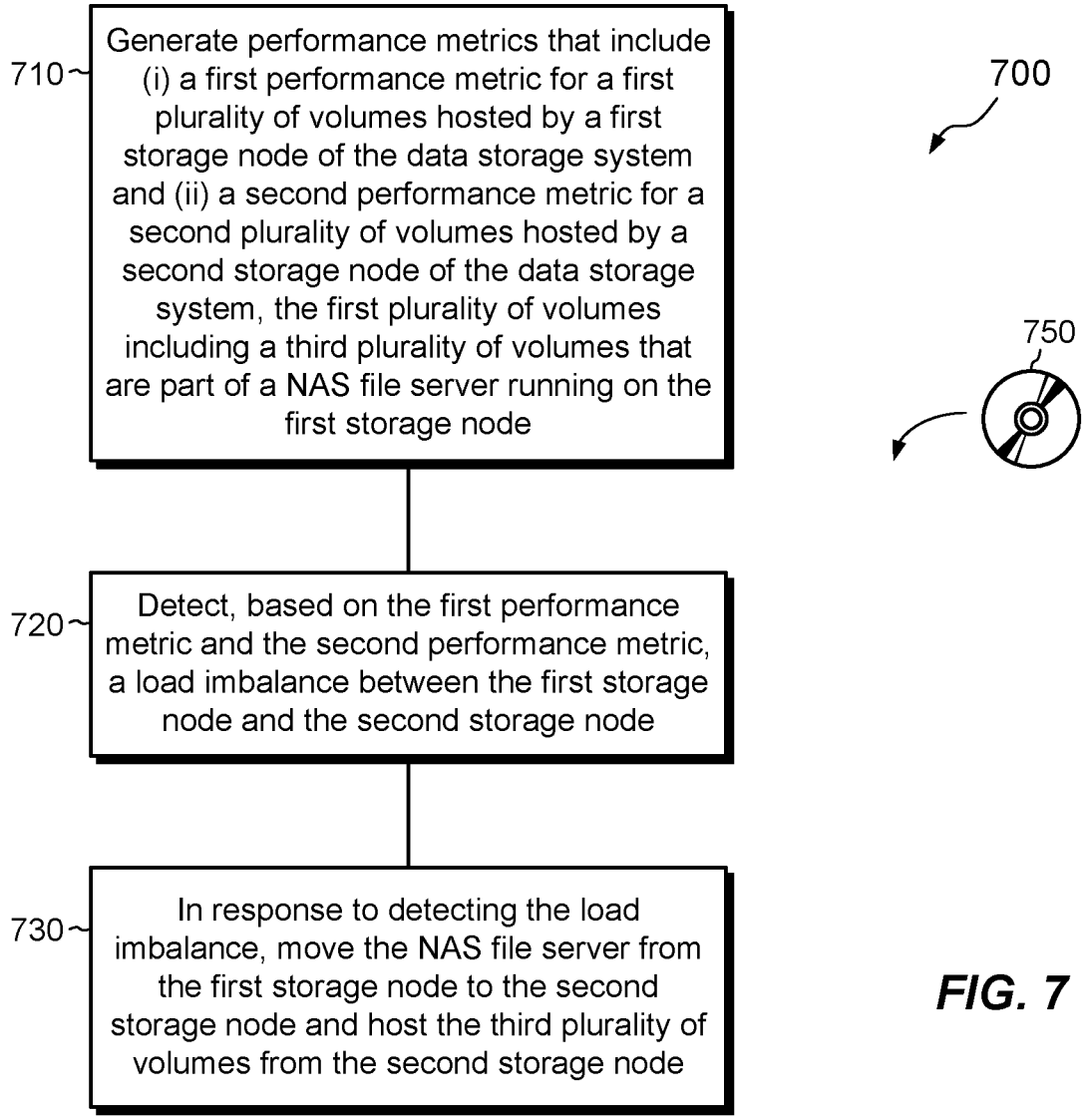
FIG. 7 is a flowchart showing an example method of load balancing in a data storage system.

FIG. 7 shows an example method 700 that may be carried out in connection with the environment 100. The method 700 provides a summary of some of the features described above and is typically performed, for example, by the software constructs described in connection with FIG. 1, which reside in the respective memory 630 of the storage nodes 130 and are run by the respective sets of processors 620. The various acts of method 700 may be ordered in any suitable way. Accordingly, embodiments may be constructed in which acts are performed in orders different from that illustrated, which may include performing some acts simultaneously.

At 710, performance metrics are generated. The performance metrics include (i) a first performance metric (e.g., 134a and/or 410) for a first plurality of volumes 170a hosted by a first storage node 130a of the data storage system 120 and (ii) a second performance metric (e.g., 134b and/or 420) for a second plurality of volumes 170b hosted by a second storage node 130b of the data storage system 120. The first plurality of volumes 170a includes a third plurality of volumes 170c that is part of a NAS file server 160 running on the first storage node 130a.

At 720, a load imbalance is detected between the first storage node 130a and the second storage node 130b, based on the first performance metric and the second performance metric.

At 730, in response to detecting the load imbalance, the NAS file server 160 is moved from the first storage node 130a to the second storage node 130b and the third plurality of volumes 170c is hosted from the second storage node 130b. An improved load balance between the first storage node 130a and the second storage node 130b is thereby achieved.

An improved technique has been described for performing load balancing between storage nodes 130. The technique includes generating a first performance metric (e.g., 134a and/or 410) for volumes 170a accessed through a first storage node 130a and generating a second performance metric (e.g., 134b and/or 420) for volumes 170b accessed through a second storage node 130. The volumes 170a accessed through the first storage node include a set of volumes 170c that belong to a NAS file server 160 hosted by the first storage node 130. In response to detecting a load imbalance based on the first performance metric and the second performance metric, the technique further includes moving the NAS file server 160 from the first storage node 130a to the second storage node 130b and hosting the set of volumes 170c that belong to the NAS file server 160 from the second storage node 130b.

Having described certain embodiments, numerous alternative embodiments or variations can be made. For instance, the embodiments depicted above apply to a data storage system 120 having two storage nodes 130a and 130b. This is just an example, however, as embodiments may include a greater number of storage nodes 130. For example, such storage nodes may be arranged in a storage cluster.

Also, the depicted examples show a data storage system 120 constituted by a single storage appliance, i.e., a pair of storage nodes 130 connected to shared persistent storage 180. This is also merely an example. For instance, multiple storage appliances may be provided, with each appliance having its own pair of storage nodes and shared persistent storage. In such examples, the load balancer 140 may attempt to optimize workload balance both within storage appliances and across multiple storage appliances, which may include moving NAS file servers, ungrouped volumes, and/or grouped volumes, from one storage appliance to another. In some examples, workload rebalancing among different storage appliances may include migrating underlying data from one appliance to another.

Further, although embodiments have been described in connection with a data storage system configured as a block-storage server, in which one or more NAS file servers may be run in containers, embodiments are not limited to such arrangements. For example, embodiments may include any type of storage system that is capable of supporting both block and file access.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 750 in FIG. 7). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of load balancing in a data storage system, comprising:
   performing, by a first storage node of the storage system and a second storage node of the storage system, I/O operations on behalf of clients, the first storage node and the second storage node each having respective control circuitry that includes a set of processing units coupled to memory;
   generating performance metrics that include (i) a first performance metric for a first plurality of volumes hosted by the first storage node of the data storage system and (ii) a second performance metric for a second plurality of volumes hosted by the second storage node of the data storage system, the first plurality of volumes including a third plurality of volumes that is part of a NAS file server running on the first storage node;
   detecting, based on the first performance metric and the second performance metric, a load imbalance between the first storage node and the second storage node; and
   in response to detecting the load imbalance, (1) moving the NAS file server from the first storage node to the second storage node, including (a) disabling the NAS file server running on the first storage node and (b) instantiating the NAS file server on the second storage node, and (2) hosting the third plurality of volumes from the second storage node,
   wherein the first performance metric and the second performance metric are generated based on respective sums of per-volume metrics for individual volumes in the first plurality of volumes and the second plurality of volumes, wherein the first performance metric is based at least in part on the third plurality of volumes that is host-accessible via the NAS file server using a file-based protocol, and wherein the second performance metric is based at least in part on a volume that is host-accessible using a block-based protocol, the method thereby providing a common mechanism based on the per-volume metrics for load balancing data accessed using both block-based and file-based protocols.

2. The method of claim 1,
   wherein the first plurality of volumes includes an additional volume in addition to the third plurality of volumes, the additional volume serving block-based storage requests from a host via a first path that extends between the host and the first storage node, the first path designated as ALUA active/optimized, and
   wherein the method further comprises, in response to detecting the load imbalance, redirecting the host to access the additional volume via the second storage node by designating the first path as ALUA active/non-optimized and designating a second path as ALUA active/optimized, the second path extending between the host and the second storage node.

3. The method of claim 2, wherein (i) moving the NAS file server and (ii) redirecting the host are responsive to commands from a load balancer of the data storage system, the load balancer varying load balance between the first storage node and the second storage node by controlling both block and file data access.

4. The method of claim 1, further comprising identifying volumes of the third plurality of volumes based on at least one of (i) a table that identifies member volumes of the NAS file server or (ii) a naming convention that names each volume of the third plurality of volumes with a name that includes an indicator of the NAS file server.

5. The method of claim 1, wherein generating the performance metrics further includes generating a third performance metric for the third plurality of volumes, and wherein detecting the load imbalance is further based on the third performance metric.

6. The method of claim 5, wherein generating at least one of the first, second, and third performance metrics includes calculating a respective sum of per-volume performance metrics of volumes in the respective plurality of volumes.

7. The method of claim 6, wherein each of the per-volume performance metrics is based on I/O reads and/or writes of the respective volume.

8. The method of claim 1, further comprising accessing, by the NAS file server on the second storage node, a set of LUNs (Logical UNits) that back the third plurality of volumes via a set of paths that are designated as ALUA active/optimized.

9. The method of claim 1, further comprising, prior to moving the NAS file server, enabling access via the first storage node to a set of LUNs that back the third plurality of volumes through (i) a first set of paths that are designated as ALUA active/optimized and do not pass through the second storage node and (ii) a second set of paths that are designated as ALUA active/non-optimized and do pass through the second storage node.

10. The method of claim 9, further comprising, after moving the NAS file server, enabling access via the second storage node to the set of LUNs through (i) a third set of paths that are designated as ALUA active/optimized and do not pass through the first storage node and (ii) a fourth set of paths that are designated as ALUA active/non-optimized and do pass through the first storage node.

11. The method of claim 1, wherein the first storage node and the second storage node are parts of a single data storage appliance, the data storage appliance further including shared persistent storage that backs the first plurality of volumes and the second plurality of volumes.

12. The method of claim 1, wherein the first storage node is part of a first storage appliance and the second storage node is part of a second data storage appliance.

13. A computerized apparatus, comprising a first storage node and a second storage node coupled to shared persistent storage, each storage node having respective control circuitry that includes a set of processing units coupled to memory, the control circuitry of the first storage node and the second storage node constructed and arranged to:
perform, by the first storage node and the second storage node, I/O operations on behalf of clients;
generate performance metrics that include (i) a first performance metric for a first plurality of volumes hosted by the first storage node and (ii) a second performance metric for a second plurality of volumes hosted by the second storage node, the first plurality of volumes including a third plurality of volumes that is part of a NAS file server running on the first storage node;
detect, based on the first performance metric and the second performance metric, a load imbalance between the first storage node and the second storage node; and
in response to detection of the load imbalance, (1) move the NAS file server from the first storage node to the second storage node, including (a) disabling the NAS file server running on the first storage node and (b) instantiating the NAS file server on the second storage node, and (2) host the third plurality of volumes from the second storage node,
wherein the first performance metric and the second performance metric are generated based on respective sums of per-volume metrics for individual volumes in the first plurality of volumes and the second plurality of volumes, wherein the first performance metric is based at least in part on the third plurality of volumes that is host-accessible via the NAS file server using a file-based protocol, and wherein the second performance metric is based at least in part on a volume that is host-accessible using a block-based protocol, the control circuitry thereby constructed and arranged to provide a common mechanism for load balancing based on the per-volume metrics data accessed using both block-based and file-based protocols.

14. The computerized apparatus of claim 13,
wherein the first plurality of volumes includes an additional volume in addition to the third plurality of volumes, the additional volume serving block-based storage requests from a host via a first path that extends between the host and the first storage node, the first path designated as ALUA active/optimized, and
wherein, in response to detection of the load imbalance, the control circuitry is further constructed and arranged to redirect the host to access the additional volume via the second storage node by designating the first path as ALUA active/non-optimized and designating a second path as ALUA active/optimized, the second path extending between the host and the second storage node.

15. A computer program product including a set of non-transitory, computer-readable media having instructions which, when executed by control circuitry of a computerized apparatus, cause the computerized apparatus to perform a method of load balancing, the method comprising:
performing, by a first storage node of the storage system and a second storage node of the storage system, I/O operations on behalf of clients, the first storage node and the second storage node each having respective control circuitry that includes a set of processing units coupled to memory;
generating performance metrics that include (i) a first performance metric for a first plurality of volumes hosted by the first storage node of a data storage system and (ii) a second performance metric for the second plurality of volumes hosted by a second storage node of the data storage system, the first plurality of volumes including a third plurality of volumes that is part of a NAS file server running on the first storage node;
detecting, based on the first performance metric and the second performance metric, a load imbalance between the first storage node and the second storage node; and
in response to detecting the load imbalance, (1) moving the NAS file server from the first storage node to the second storage node, including (a) disabling the NAS file server running on the first storage node and (b) instantiating the NAS file server on the second storage node, and (2) hosting the third plurality of volumes from the second storage node,
wherein the first performance metric and the second performance metric are generated based on respective sums of per-volume metrics for individual volumes in the first plurality of volumes and the second plurality of volumes, wherein the first performance metric is based at least in part on the third plurality of volumes that is host-accessible via the NAS file server using a file-based protocol, and wherein the second performance metric is based at least in part on a volume that is host-accessible using a block-based protocol, the method thereby providing a common mechanism based on the per-volume metrics for load balancing data accessed using both block-based and file-based protocols.

16. The computer program product of claim 15,
wherein the first plurality of volumes includes an additional volume in addition to the third plurality of volumes, the additional volume serving block-based storage requests from a host via a first path that extends between the host and the first storage node, the first path designated as ALUA active/optimized, and
wherein the method further comprises, in response to detecting the load imbalance, redirecting the host to access the additional volume via the second storage node by designating the first path as ALUA active/non-optimized and designating a second path as ALUA active/optimized, the second path extending between the host and the second storage node.

17. The computer program product of claim 16, wherein (i) moving the NAS file server and (ii) redirecting the host are responsive to commands from a load balancer of the data storage system, the load balancer varying load balance between the first storage node and the second storage node by controlling both block and file data access.

18. The computer program product of claim 15, wherein generating the performance metrics further includes generating a third performance metric for the third plurality of volumes, and wherein detecting the load imbalance is further based on the third performance metric.

19. The computer program product of claim 15, wherein the method further comprises:
prior to moving the NAS file server, enabling access via the first storage node to a set of LUNs that back the third plurality of volumes through (i) a first set of paths that are designated as ALUA active/optimized and do not pass through the second storage node and (ii) a second set of paths that are designated as ALUA active/non-optimized and do pass through the second storage node; and
after moving the NAS file server, enabling access via the second storage node to the set of LUNs through (i) a third set of paths that are designated as ALUA active/optimized and do not pass through the first storage node and (ii) a fourth set of paths that are designated as ALUA active/non-optimized and do pass through the first storage node.

20. The method of claim 1,
wherein the first plurality of volumes includes a fourth plurality of volumes that is not part of the third plurality of volumes, the fourth plurality of volumes including block-based volumes; and
wherein moving the NAS file server includes not moving the fourth plurality of volumes.

* * * * *